US012709190B2

(12) United States Patent
Bessler et al.

(10) Patent No.: US 12,709,190 B2
(45) Date of Patent: Aug. 18, 2026

(54) COOLING-LINE SYSTEM OF A MODULAR CONSTRUCTION, IN PARTICULAR FOR BATTERIES OF ELECTRIC VEHICLES

(71) Applicant: Witzenmann GmbH, Pforzheim (DE)

(72) Inventors: Frank Bessler, Wiernsheim (DE); Ricardo Andre Dias-Assis, Bretten (DE); Nicolas Drouart, Engelsbrand (DE); Antoine Joguet, Pforzheim (DE); Maximilian Ritter, Höfen an der Enz (DE)

(73) Assignee: Witzenmann GmbH, Pforzheim (DE)

( * ) Notice: Subject to any disclaimer, the term of this patent is extended or adjusted under 35 U.S.C. 154(b) by 971 days.

(21) Appl. No.: 17/963,290

(22) Filed: Oct. 11, 2022

(65) Prior Publication Data

US 2023/0113220 A1 Apr. 13, 2023

(30) Foreign Application Priority Data

Oct. 12, 2021 (DE) ......................... 102021126428.6

(51) Int. Cl.
*B60L 58/26* (2019.01)
*B60L 50/64* (2019.01)

(52) U.S. Cl.
CPC ............... *B60L 58/26* (2019.02); *B60L 50/64* (2019.02)

(58) Field of Classification Search
CPC ...... F16L 25/009; F16L 37/248; F16L 37/252
See application file for complete search history.

(56) References Cited

U.S. PATENT DOCUMENTS

| | | | | |
|---|---|---|---|---|
| 617,591 | A * | 1/1899 | Miller et al. .......... | F16L 37/252 285/361 |
| 1,910,706 | A * | 5/1933 | Malzard .................. | F16L 33/12 277/621 |
| 2011/0293985 | A1 * | 12/2011 | Champion .......... | H01M 10/625 165/104.33 |
| 2018/0212285 | A1 * | 7/2018 | Huang .............. | H01M 10/6568 |
| 2018/0287232 | A1 * | 10/2018 | Koegel ............... | H01M 10/613 |

FOREIGN PATENT DOCUMENTS

| | | |
|---|---|---|
| DE | 10250305 | 9/2004 |
| EP | 3351888 | 12/2019 |

* cited by examiner

*Primary Examiner* — Maria Laios
(74) *Attorney, Agent, or Firm* — Volpe Koenig

(57) ABSTRACT

A cooling-line system (10) of modular construction, in particular for batteries of electric vehicles, having at least one tubular connecting element (11) composed of a first metal; and at least two tubular or hose-like line elements (15, 16) composed of a second metal, which line elements (15, 16) are or can be connected by the connecting element (11), or at least one such line element (15, 16) which can be connected by the connecting element (11) to a function module to be cooled, preferably a battery.

19 Claims, 7 Drawing Sheets

COOLING-LINE SYSTEM OF A MODULAR CONSTRUCTION, IN PARTICULAR FOR BATTERIES OF ELECTRIC VEHICLES

INCORPORATION BY REFERENCE

The following documents are incorporated herein by reference as if fully set forth: German Patent Application No. 10 2021 126 428.6, filed Oct. 12, 2021.

TECHNICAL FIELD

The invention relates to a cooling-line system of modular construction, in particular for batteries of electric vehicles.

BACKGROUND

Cooling lines, in particular for batteries of electric vehicles, are nowadays normally produced in plastic and in one piece.

Due to the one-piece configuration, such cooling lines are highly limited in terms of their use and generally can be used only in a single type of vehicle. Moreover, lack of scalability affects such cooling lines, which is disadvantageous in particular because the manufacturers are increasingly adopting the approach of producing batteries which consist of multiple individual modules and which are scaled according to the power requirement of the vehicle.

Furthermore, plastics are resistant to heat only within certain limits. It is foreseeable that, in the future, there could be a requirement for long-term heat resistance for such cooling lines. For example, the "fire resistance test" of EU standard ECE R100.02 provides that battery modules which are less than 1.5 m away from the ground are directly exposed to flames for 70 seconds. Highly safety-relevant subjects (so-called "thermal runaway" for purely battery-electric vehicles or heat-related subjects in the case of hybrid vehicles) are involved. It is therefore increasingly necessary for the plastic lines to be thermally insulated, which entails various disadvantages in terms of the costs, weight and structural space.

SUMMARY

The invention is based on the object of specifying a cooling-line system of modular construction, in particular for batteries of electric vehicles, that is distinguished by increased fire resistance and that is moreover easily adaptable to different (geometrical) requirements, so that wide-ranging scalability is achieved. Moreover, the intention is for the proposed cooling-line system to be distinguished by simplified and possibly automatable mounting.

According to the invention, said object is achieved by a cooling-line system of modular construction having one or more of the features disclosed herein. Advantageous refinements of the fundamental idea according to the invention are defined below and in the claims.

According to the invention, a cooling-line system of modular construction, in particular for batteries of electric vehicles, comprises at least one tubular connecting element, which connecting element may be configured to be straight or bent, composed of a first metal; and at least two tubular or hose-like line elements composed of a second metal, which line elements are or can be connected by means of the connecting element, or at least one such line element which can be connected by means of the connecting element to a function module to be cooled, preferably a battery.

Preferably, the cooling-line system comprises—in a corresponding refinement—a multiplicity of line elements and a multiplicity of connecting elements, so that complex geometrical arrangements can also be realized. Specific examples are presented further below in the description of the figures.

Within the scope of the present invention, it is not absolutely necessary for the first metal and the second metal to be different metals. For example, the metal may be high-grade steel or aluminum in both cases. However, so-called hybrid solutions, in the case of which the connecting element consists for example of aluminum and the line element or the line elements consists or consist of steel, preferably high-grade steel, are particularly advantageous. In all these cases, sufficient fire resistance can be achieved, wherein additionally, Due to the significantly smaller wall thickness in comparison with plastic, in particular in the case of line elements composed of thin-walled high-grade steel, very light and space-saving designs are possible.

In particular the line element or the line elements may be (annular) corrugated hoses, bellows or else smooth (bending) tubes, according to requirement and possibly also in any desired combination.

A central element of the modular construction is the already mentioned connecting element, which can preferably be designed in the manner of a T-piece, albeit without the invention being limited thereto. Such a connecting element may serve to connect two line elements to one another in a fluid-conducting manner. It is moreover possible for yet a further (third) line element to be connected in a fluid-conducting manner via the (at least one) T-branch.

Alternatively, the connecting element may however also be designed without a branch/branches, and is moreover not limited to straight configurations. It has proven to be particularly advantageous if the connecting element is configured to be bent, in particular with a bend angle of approximately 90°, wherein said connecting element preferably serves to connect a line element of the stated type directly to a function module to be cooled, such as a battery. In the course of this configuration, the connecting element may have at one (connection) end a standardized standard connection, in particular of the SAE or VDA type, without the invention being limited in this respect.

The fluid-conducting attachment of the line element or the line elements to the connecting element may be produced in a materially bonded manner, in particular through soldering, welding or adhesion, in a force-fitting manner (for example through pressing) or via a mechanical connection (form fit).

If the connecting element is in the form of a T-piece, the stated branch may be produced in particular as a neck or punched-out formation. The invention is however—as mentioned—not limited to connecting elements having a single branch; rather, it is also possible for provision to be made of multiple branches, which may be arranged at different axial and/or circumferential positions.

In the region of connection ends of the connecting element, for increased sealing requirements, it is possible for provision to be made of additional connection parts (sleeves), which are preferably deep-drawn (without weld seam).

Due to the modular construction, the proposed cooling-line system can be scaled virtually as desired in terms of unit quantities, diameters, lengths, outlets, flexibility (in particular of the line elements), etc.

The following refinements of the cooling-line system according to the invention have proven to be particularly advantageous, wherein some configurations have already been briefly referred to further above:

In a first refinement of the cooling-line system according to the invention, it may be provided that the connecting element has a first connection end and a second connection end, which connection ends are configured and provided for connection to in each case one of the line elements or to the line element, and that the connecting element has at least one branch between the connection ends, to which branch a further line element composed of a metal is or can be connected. Reference has already been made to this further above. The use of such connecting elements makes it possible to construct branched line systems, wherein it may be provided in particular that provision is made of multiple branches which depart from the connecting element in different directions and/or at different axial positions.

It has, in terms of manufacturing technology, proven to be particularly advantageous if, in another refinement of the cooling-line system according to the invention, the branch (es) is/are in the form of a neck or punched-out formation.

Yet another refinement of the cooling-line system according to the invention provides that a connection part for the further line element is arranged on the (at least one) branch, preferably attached in a materially bonded manner, which connection part is preferably designed in a manner corresponding to the first connection end or to the second connection end. It has already been pointed out that such a connection part may preferably be in the form of a deep-drawn part without a weld seam or the like in order for increased sealing requirements to be satisfied.

If the connecting element is in the form of a T-piece, it can be connected in a fluid-conducting manner to up to three line elements. The line elements may be attached in the same way or in different ways, preferably being pressed in and attached in a materially bonded manner, in particular soldered, in order to achieve sufficient mechanical secureness and sufficient fluid tightness.

In yet another refinement of the cooling-line system according to the invention, it may be provided that the connecting element is widened at at least one of the connection ends, and at least one of the line elements or the line element is or can be pushed into, preferably is or can be pressed into, the widened connection end.

In addition, in this region, it is also possible for a materially bonded connection to be realized, in particular through soldering, as already discussed above. A corresponding refinement of the cooling-line system according to the invention therefore provides that the at least one of the line elements or the line element is or can be fixed in a materially bonded manner, preferably is or can be soldered, in the widened connection end.

It has proven to be particularly advantageous if, in yet another refinement of the cooling-line system according to the invention, at least one of the line elements or the line element is designed as a corrugated-hose portion or has at least one corrugated-hose portion. In this way, the line elements are sufficiently flexible and can also compensate for certain production tolerances. Moreover, in the case of a corrugated configuration of the line elements, which in present case comprises all the configurations in which the line elements have at least one corrugation or one (encircling) radial bulge, it is possible to realize diverse sealing and fixing possibilities, which will be discussed in more detail below.

Another refinement of the cooling-line system according to the invention provides in particular that, at at least one of the connection ends, a sealing element, preferably an O-ring, is or can be arranged between the connecting element and at least one of the line elements or the line element, which sealing element is or can be arranged preferably between two corrugations in the corrugated-hose portion. If only one corrugation is provided, the seal element can bear laterally in a snug manner against the flank of said corrugation. The sealing element is thereby fixed in its (axial) position.

Yet another refinement of the cooling-line system according to the invention provides that, at at least one of the connection ends, the connecting element is of slotted form over a sub-region of its circumference and has a corresponding slot (cutout), and that provision is additionally made of at least one fixing element, preferably a U-shaped spring element, which fixing element is or can be pushed into the slot and over a part of the circumference of the line element between two corrugations in the corrugated-hose portion in order to fix the respective line element to the connecting element in a form-fitting manner. If only one corrugation is provided, the fixing element may be arranged behind said one corrugation in a pull-out direction. This results in a simple connection possibility which is in particular also easily automatable.

Yet another refinement of the cooling-line system according to the invention provides it with an additional clamp element, which clamp element is configured to engage over the connecting element and the at least one of the line elements or the line element at the at least one connection end in the region of the sealing element, of a corrugation of the line element and of an end widening of the connecting element from the outside in a form-fitting manner. This results in a simple connection possibility which is easily automatable.

Alternatively, in a refinement of the cooling-line system according to the invention, it is also possible for this to be provided with an additional clip element, which clip element has a preferably U-shaped main body by way of which it is or can be pushed onto the connecting element or onto one of the line elements or the line element, preferably adjacent to a respective radial widening. The clip element moreover has at least one preferably U-shaped retaining bracket integrally formed on the main body, which retaining bracket can be pivoted in relation to the main body behind a respective radial widening on the other of the two elements connecting element and line element in a pull-out direction in order for the respective line element to be fixed in a form-fitting manner to the connecting element. Again, a simple connection possibility which is easily automatable is the result.

It has proven to be particularly advantageous if, in a refinement of the cooling-line system according to the invention, the first and the second connection ends are designed to be different. In this way, the modular connection possibilities are increased. It has already been pointed out that in particular a connection end may have a standardized connection type. Alternatively, however, it is also possible for the first and second connection ends to be formed similarly, in order in particular for the connecting element to be able to be connected to similar or identical line elements on both sides. The same also applies to the branch(es).

A particularly advantageous configuration of the cooling-line system according to the invention can be achieved if the connecting element and the line element(s) are produced from different materials, in particular if the first metal is aluminum and the second metal is high-grade steel. In this way, the flexibility of use is increased even further. Alternatively, however, it is possible for all the stated elements to be formed in one and the same material, for example high-grade steel or aluminum.

It has already been pointed out that the connecting element can be used in a particularly flexible manner if provision is made of a plurality of branches, preferably at different circumferential positions.

In this case, it may be provided both that the connecting element is configured to be straight and that the connecting element is configured to be bent.

In particular if the connecting element is configured to be bent, it may be provided that it has on one side (on a connection end) a standardized standard connection, preferably of the VDA or SAE type. This feature is however in no way restricted to bent connecting elements.

In another refinement of the cooling-line system according to the invention, it may be provided that multiple connecting elements are arranged adjacently, preferably parallel to one another, and that at least one spacer is arranged between at least two connecting elements. Beside the mere spacing-apart of the connecting elements, the spacer can form a series of additional functions.

Said additional functions comprise in particular a mounting, rotation and positioning aid, a combination of clamp/clip and spacer to form a component (reduction of the individual parts), an additional supporting structure for the battery, fastening possibilities for sensors and cables, means for vibration decoupling, for example through the use of suitable materials or geometries (for example corrugated) or through the use of additional wire pressing rings between spacer and the line elements (connecting elements).

The spacer may be attached to the connecting elements in a materially bonded manner, in particular welded or soldered thereto; preferably, however, it is fastened to the connecting elements only by means of form-fitting.

BRIEF DESCRIPTION OF THE DRAWINGS

Further properties and advantages of the invention emerge from the following description of exemplary embodiments on the basis of drawing.

DETAILED DESCRIPTION

In the figures, identical reference signs denote identical or at least identically acting elements.

Figure 1:
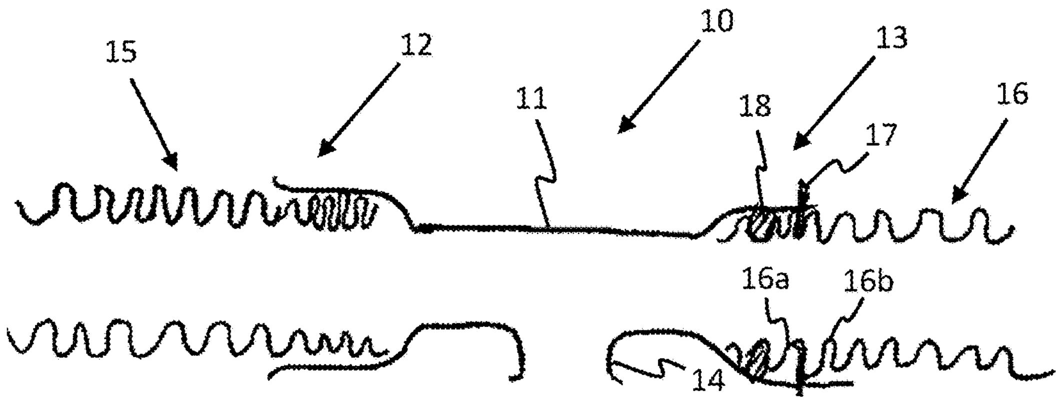
FIG. 1 shows a configuration of the cooling-line system according to the invention in longitudinal section.

FIG. 1 schematically illustrates a configuration of the cooling-line system 10 according to the invention in longitudinal section. The cooling-line system 10 comprises a tubular connecting element 11 of T-shaped form composed of a metallic material, for example aluminum or high-grade steel, having two aligned connection ends 12, 13 and having a branch 14 arranged therebetween, said branch being in the form of a neck in the present case. The connecting element is widened in the region of the connection ends 12, 13. Introduced into the connection ends 12, 13 is in each case one hose-like line element 15 or 16, respectively, which line element 15, 16 is designed in the manner of an annular corrugated hose. On the left in FIG. 1, the annular corrugated hose 15 is pressed into the connection end 12 and held in a force-fitting manner there. It is additionally possible for a soldered connection to be provided, this not being illustrated in FIG. 1 however. On the right in FIG. 1, the annular corrugated hose 16 is held in a form-fitting manner in the connection end 13, for the purpose of which provision is made of a spring element 17 which engages into a region between two corrugations 16*a*, 16*b* of the line element 16 and acts as a fixing element. For this purpose, the connecting element 11 is preferably suitably cut through or has an aperture (cutout) for introduction of the fixing/spring element 17. More precise details on this connection will be given further below, in particular on the basis of FIG. 7. For sealing off the connection, provision is also made of a sealing element in the form of an O-ring 18 on the right in FIG. 1, this likewise being arranged between two corrugations (not denoted) of the line element 16.

Figure 2:
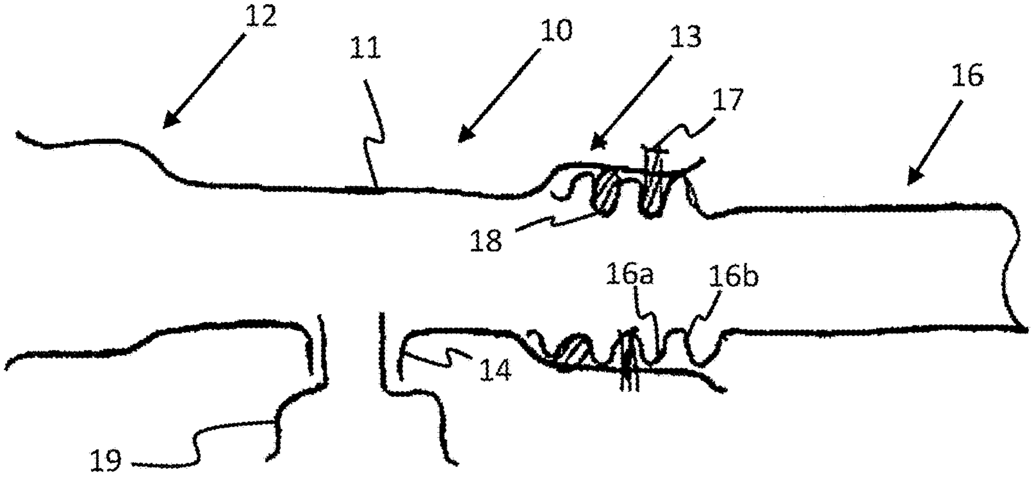
FIG. 2 shows a further configuration of the cooling-line system according to the invention in longitudinal section.

FIG. 2 schematically illustrates a further configuration of the cooling-line system 10 according to the invention in longitudinal section. In the present case, there is illustrated only a single line element at reference sign 16, which is designed in the manner of a smooth tube that has a number of corrugations 16*a*, 16*b* (not all denoted) only at the end (so-called end deformation). Alternative, it also possible for the line element 16 to be designed as a bellows, bending tube or the like. The connection to the connecting element 11 is realized in the manner already described further above on the basis of FIG. 1.

In the region of the branch 14, there is arranged a deep-drawn connection part 19 for a further line element (not shown) in order for it to be possible for a further tube part or hose part to be connected in this region. Preferably, the connection part 19 is connected in a materially bonded manner to the connecting element 11.

Figure 3:
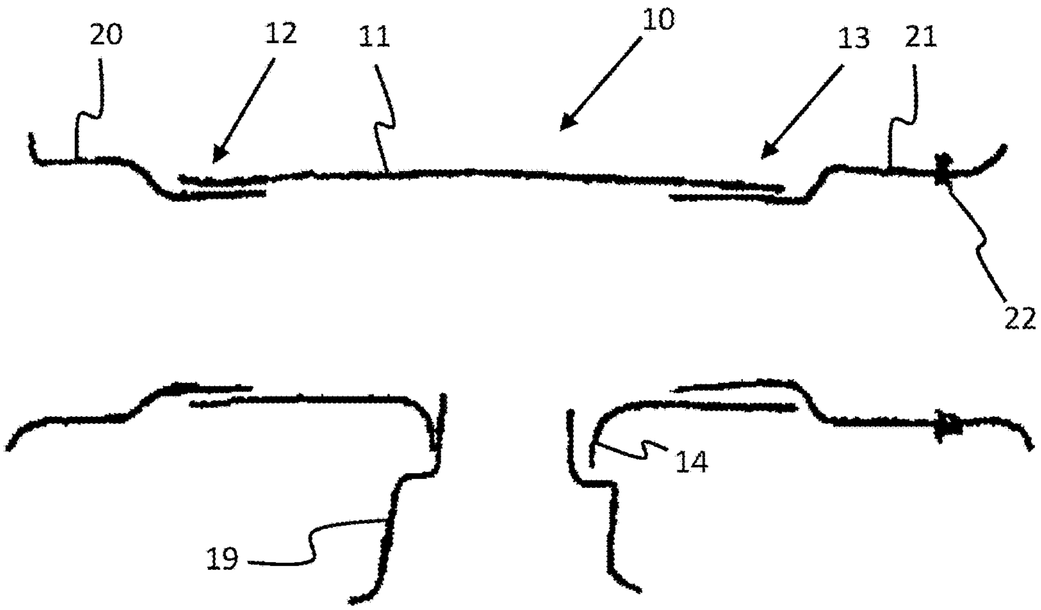
FIG. 3 shows yet a further configuration of the cooling-line system according to the invention in longitudinal section.

FIG. 3 schematically shows yet a further configuration of the cooling-line system 10 according to the invention in longitudinal section. Instead of the widened connection ends shown in FIGS. 1 and 2, the connecting element 11 as per FIG. 3 has deep-drawn, widened sleeves or connection parts 20, 21 not only at the branch 14 but also at its connection ends 12, 13, said sleeves or connection parts preferably being attached in a materially bonded manner and serving for connection to line elements (not shown here).

At reference sign 22, the connection part 21 may have a cutout (a slot) through which a spring element can be inserted for the purpose of fixing a (corrugated) line element. Reference has already been made to this further above.

Figure 4:
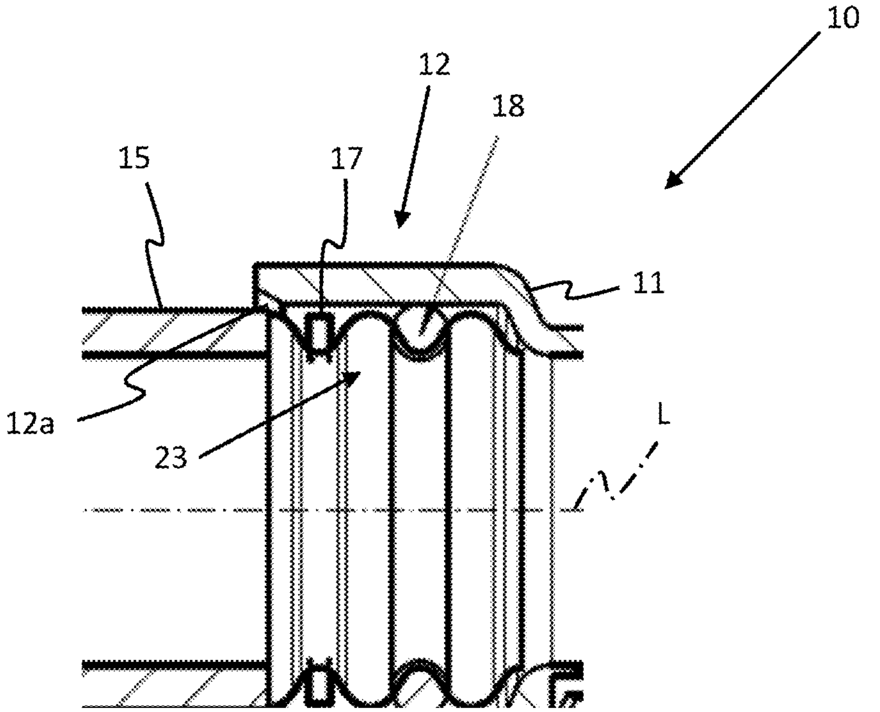
FIG. 4 shows, in longitudinal section, the connection between a connecting element and a line element in a configuration of the cooling-line system according to the invention.

FIG. 4 shows, in longitudinal section, a possible connection between a connecting element 11 with a widened connection end 12 and a line element 15 in detail, which line element 15 has a corrugated region or corrugated-hose portion 23 at the end. The connecting element 11 engages over the corrugated-hose portion 23 by way of its connection end 12; a sealing element in the form of an O-ring 18 is again arranged therebetween. Reference sign 17 again denotes a spring element which prevents the connecting element 11 from being able to be pulled off from the corrugated-hose portion 23. For this purpose, the connecting element 11 has a radially inwardly directed web 12*a* on its connection end 12 at the end, via which web the connecting element 11 possibly interacts with the spring element 17.

Reference sign L denotes the longitudinal axis of the arrangement.

Figure 5:
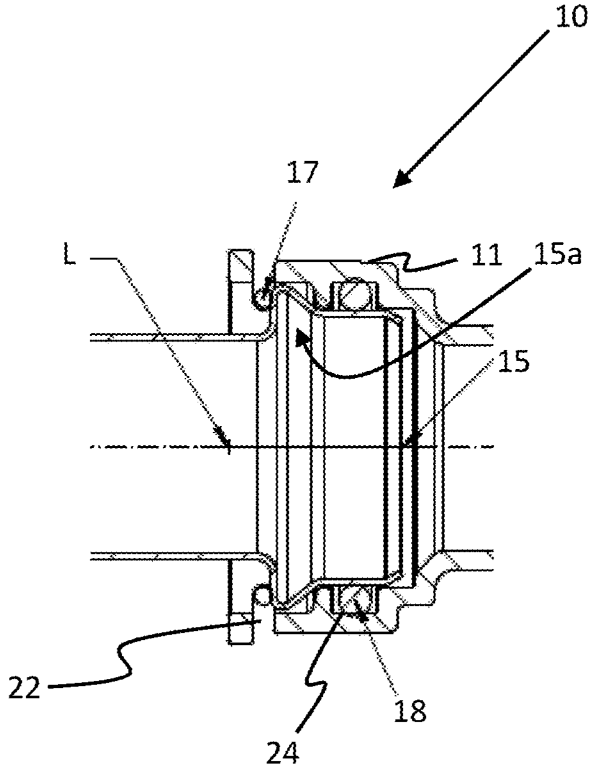
FIG. 5 shows, in longitudinal section, the connection between a connecting element and a line element in another configuration of the cooling-line system according to the invention.

FIG. 5 shows an alternative configuration of the connection between a connecting element 11 and a line element 15. The line element 15 has a single corrugation 15*a*, which is asymmetrical in cross section and is engaged over by the connecting element 11 widened at the end. The connecting element 11 has on its inner side a circumferentially encircling groove 24 in which a sealing element in the form of an O-ring 18 is held. The sealing element 18 interacts sealingly with a sealing surface, formed parallel to the longitudinal axis L, at the free end of the line element 15. For securing the connection, the connecting element 11 again has a cutout 22 into which a spring element 17 (spring clip) is inserted, said spring element interacting in a form-fitting manner with the corrugation 15*a*, as illustrated.

Figure 6A:
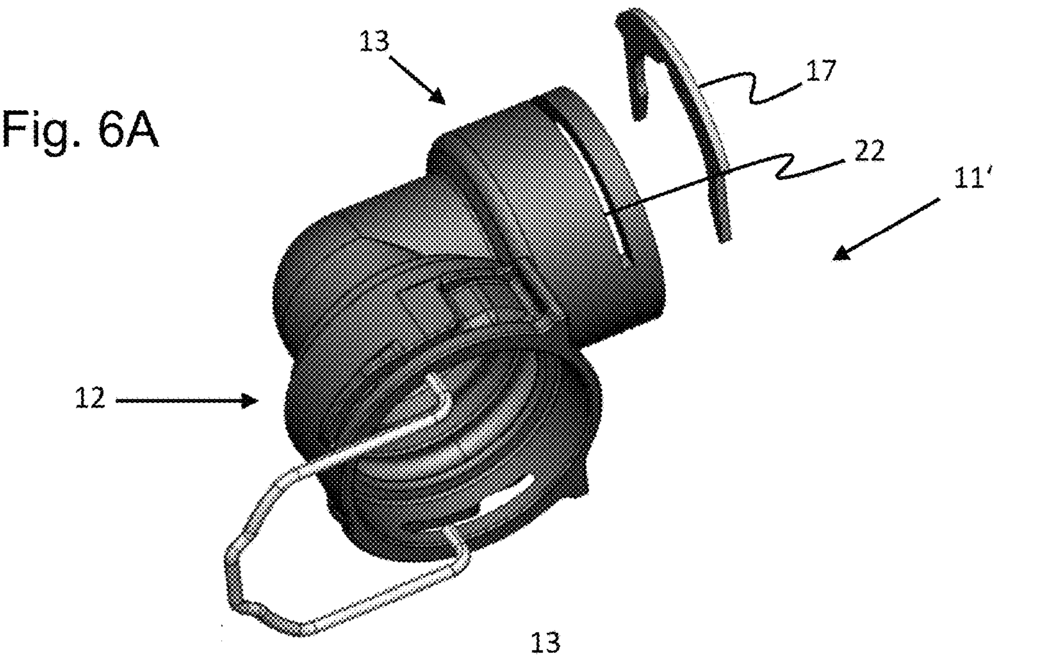
FIGS. 6A-6C show several views of a connecting element for a cooling-line system according to the invention.
Figure 6B:
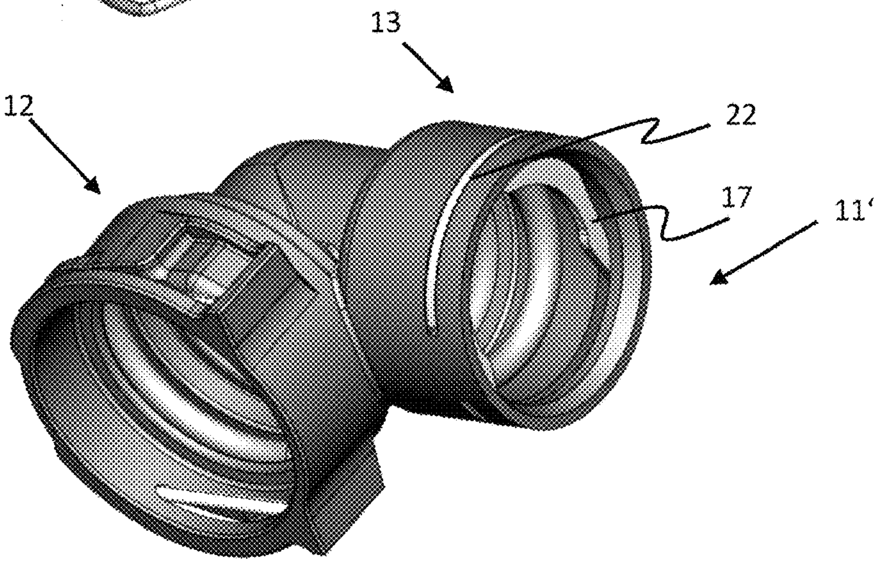
Figure 6C:
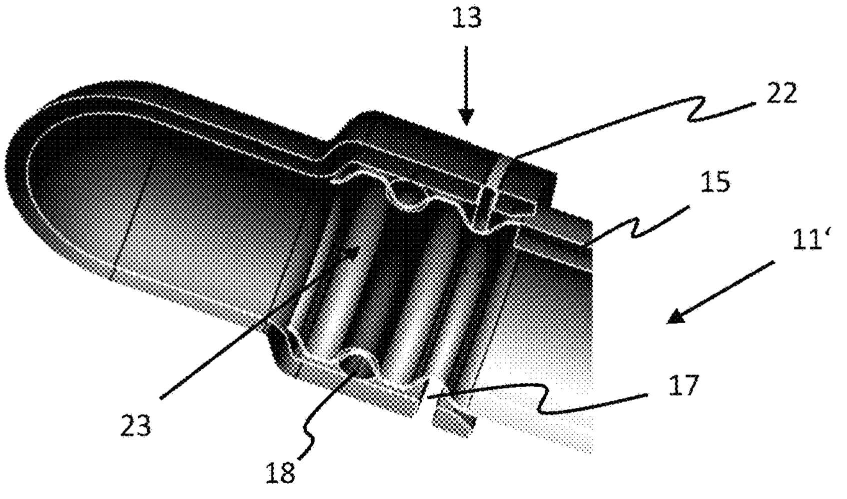

FIGS. 6A-6C show different views of a connecting element 11' which is configured to be bent or to have a 90° bend. At its connection end 13 on the right, which is again of widened form, the connecting element 11' is designed in the manner already described further above on the basis of FIGS. 1 and 2. The cutout 22 through which an approximately U-shaped spring element 17 can be introduced can be clearly seen. In FIG. 6A, the stated elements are illustrated separated from one another; in FIG. 6B, the spring element 17 has been inserted into the cutout 22. FIG. 6C shows the connection to a line element 15 which is corrugated at the end, as already described further above on the basis of FIG. 4.

At the other connection end 12, the connecting element 11' is preferably of standardized form, so as to allow connection of a further line element (not shown) or direct connection of a connection piece (not shown) of a function module to be cooled, such as a battery of an electric vehicle.

Figure 7A:
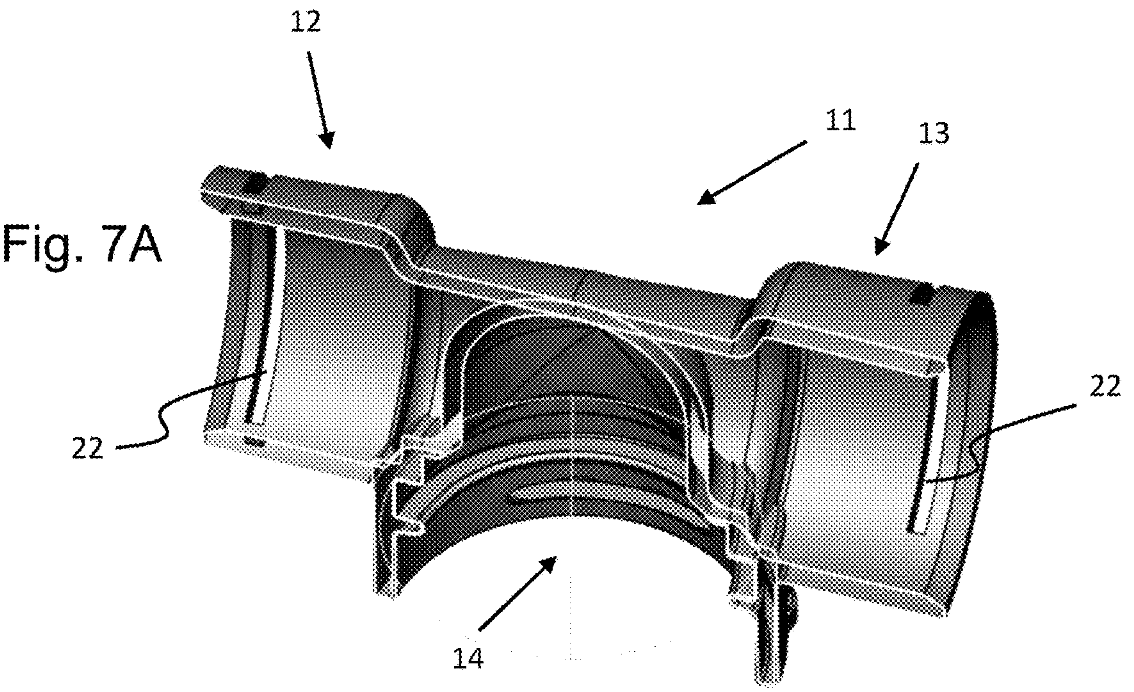
FIGS. 7A-7B show views of a further connecting element for a cooling-line system according to the invention.
Figure 7B:
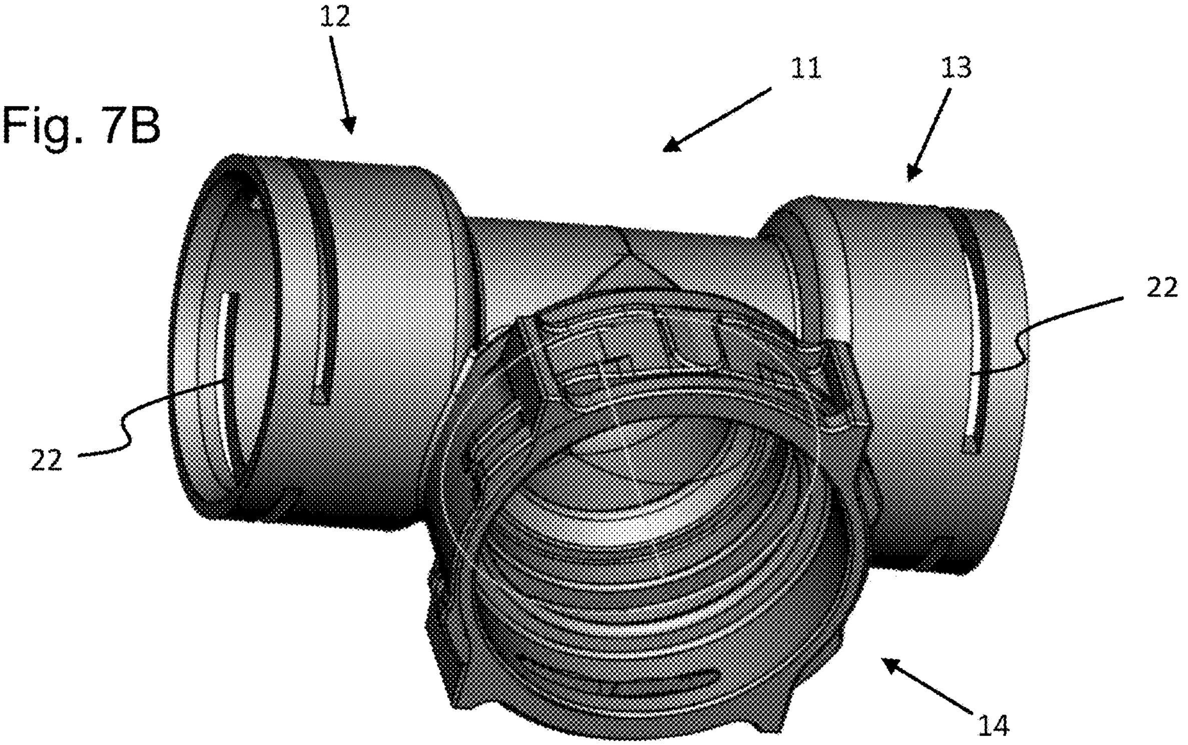

FIGS. 7A and 7B show a connecting element 11 designed as a T-piece, whose connection ends 12, 13 on the right and left are designed in the manner described in FIGS. 6A-6C for the connection end 13. In the region of the branch 14 at the bottom, the connecting element 11 may, by contrast, be designed approximately in the manner shown and described in FIGS. 6A-6C for the (lower) connection end 12 there. As shown by an additional comparison with the configuration in FIG. 5, the stated configuration in the region of the connection end 12 (in FIG. 6A-6C) or of the branch 14 (FIGS. 7*a* and 7B) furthermore corresponds substantially to the configuration described with reference to FIG. 5 of the connecting element 11 shown there.

Figure 8A:
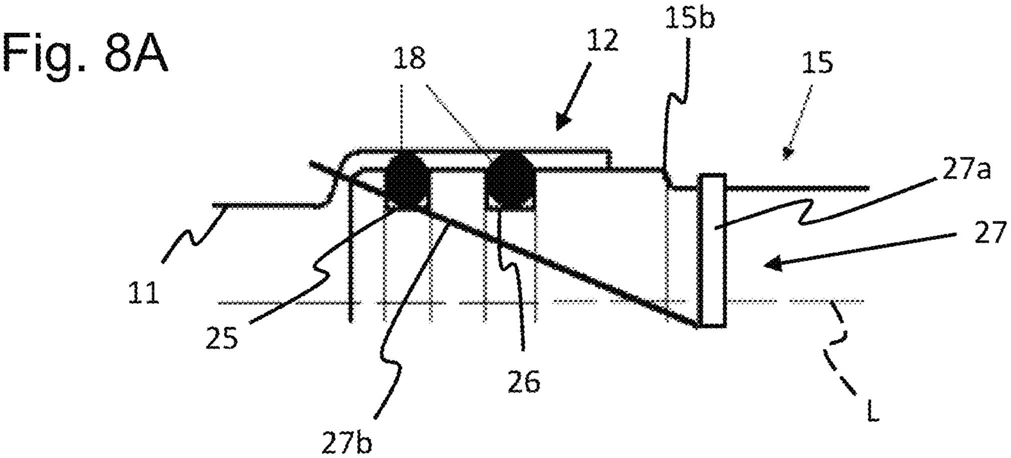
FIGS. 8A-8C show several views of the connection between a connecting element and a line element in a configuration of the cooling-line system according to the invention.
Figure 8B:
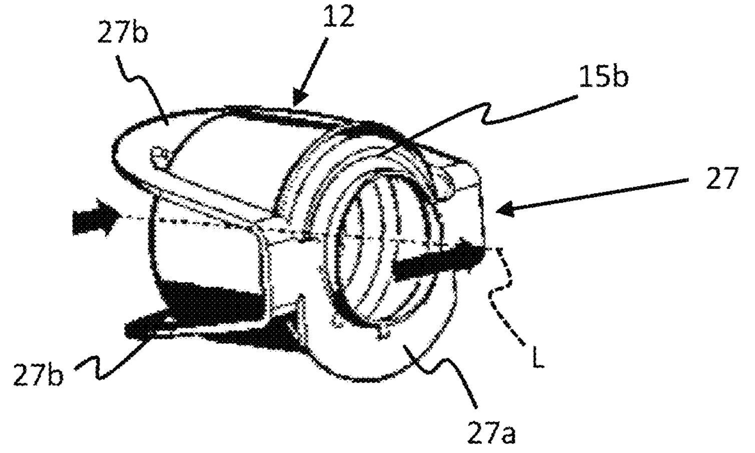
Figure 8C:
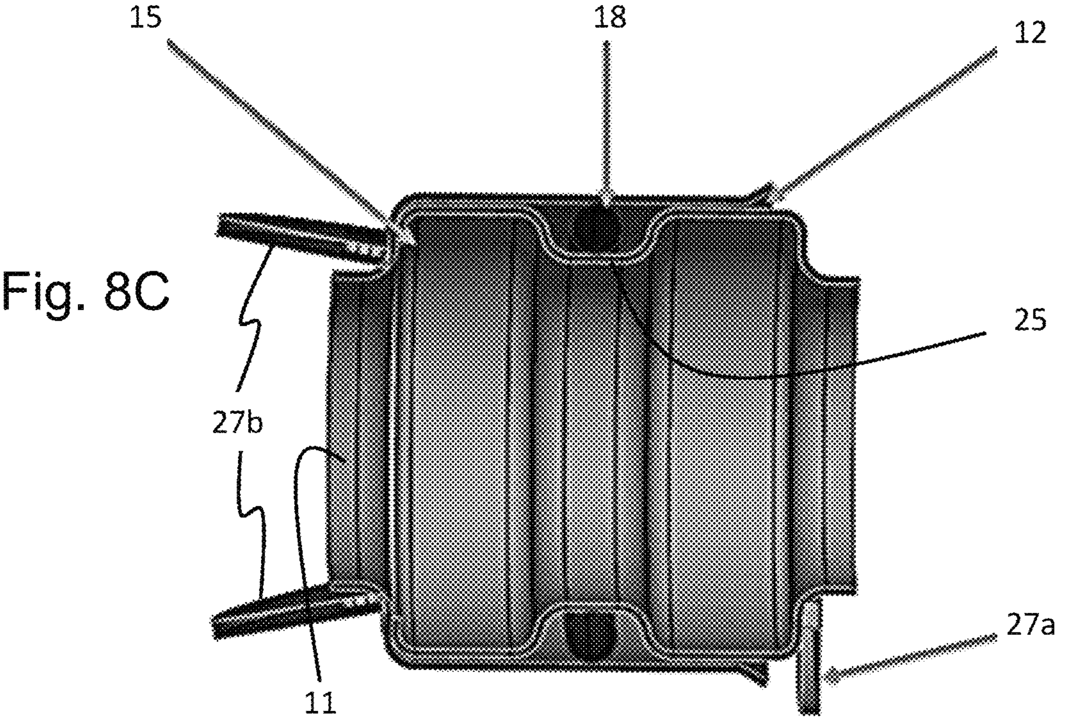

FIGS. 8A-8C show a further alternative configuration of the connection between a connecting element 11 and a line element 15.

As per FIG. 8A, the line element 15 has at the end a corrugated region or two grooves 25, 26 into which in each case one sealing element in the form of an O-ring 18 is inserted. The connecting element 11 engages over this region by way of its widened connection end 12. An additional clip element 27 is arranged on the line element 15, which clip element 27 has a U-shaped main body 27*a* by way of which it is pushed onto the line element 15, preferably at or adjacent to a respective radial widening (shoulder) 15*b*. The clip element 27 moreover has two retaining brackets 27*b* integrally formed on the main body 27*a* and U-shaped in plan view, which retaining brackets 27*b* have been pivoted in relation to the main body 27*a* behind a respective radial widening (transition to the widening 12) on the connecting element 11 in a pull-out direction in order for the line element 15 to be fixed in a form-fitting manner to the connecting element 11.

FIG. 8C shows a slightly modified configuration, in which the line element 15 has only one groove 25 and correspondingly only one O-ring 18.

Figure 9:
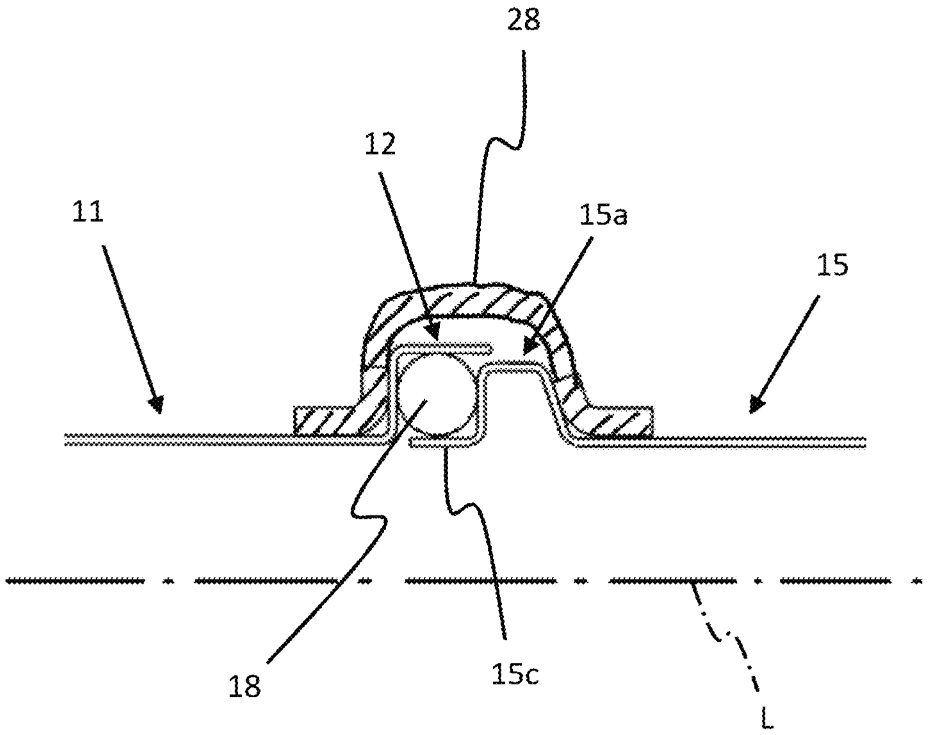
FIG. 9 shows, in part and in longitudinal section, a view of another connection between a connecting element and a line element in a configuration of the cooling-line system according to the invention.

FIG. 9 shows yet another possibility for the connection between connecting element 11 and a line element 15, with use being made of an O-ring 18 and an (outer) clamp (clamp element) 28. The clamp element 28 is configured to engage over the connecting element 11 and line element 15 at the widened connection end 12 of the connecting element 11 in the region of the sealing element 18 and of a (single) end corrugation 15*a* of the line element 15 from the outside in a form-fitting manner, as illustrated. The sealing element 18 has been received between the widened connection end 12 of the connecting element 11 and a smooth cylindrical free end 15*c* of the line element 15. The corrugation 15*a* may again be of asymmetrical form, as illustrated.

In principle, it is possible for all the connections between connecting elements 11 and line elements 15, 16 discussed above and defined in the patent claims to be combined with one another in any desired manner within the scope of the present invention.

Figure 10:
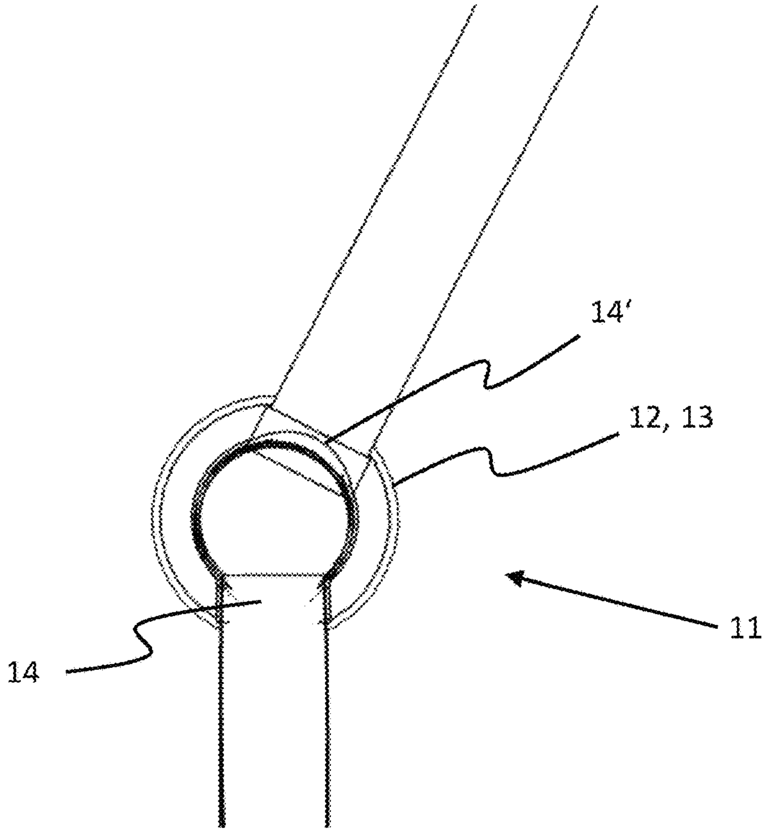
FIG. 10 shows a view of yet a further connecting element for a cooling-line system according to the invention.

FIG. 10 illustrates, with viewing direction along the longitudinal axis, that a connecting element 11 may have multiple branches 14, 14' which may depart from the connecting element 11 at different circumferential positions. In principle, the invention is not restricted with regard to the number or directions of the branches 14, 14'.

Finally, FIG. 11 illustrates once again, as a whole, a cooling-line system 10 of modular construction as can be realized using the described components within the scope of the present invention.

Figure 11:
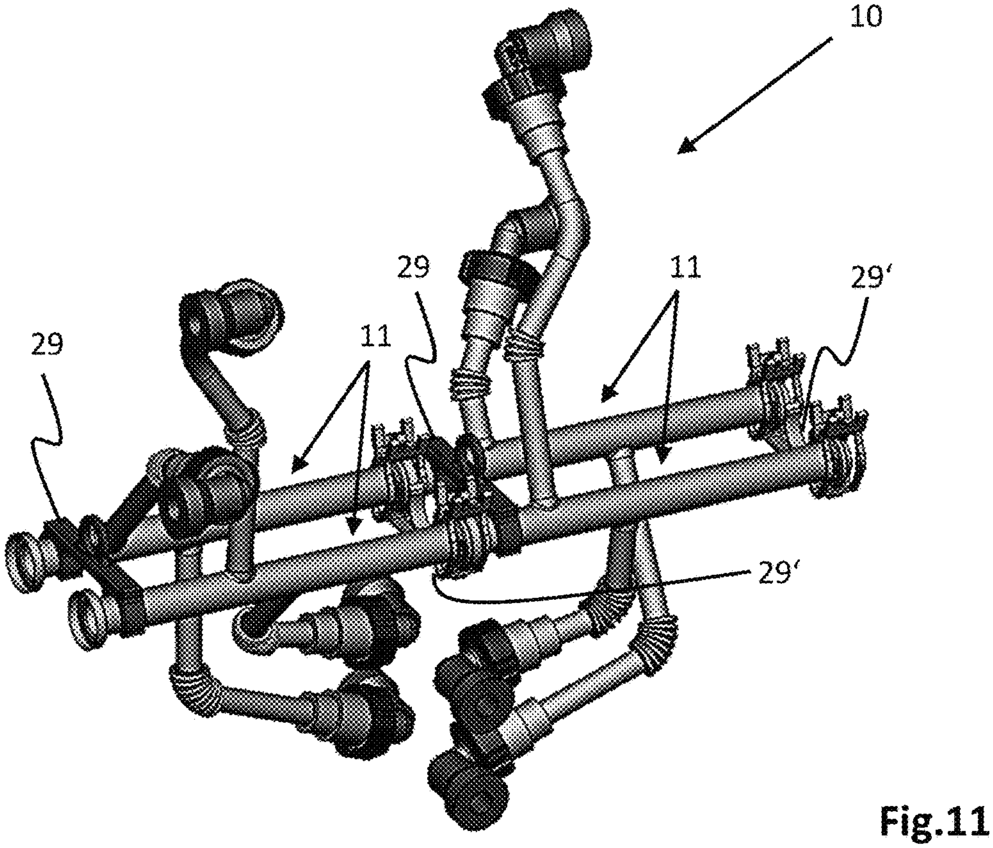
FIG. 11 shows an overall view of a cooling-line system that can be realized according to the invention.

FIG. 11 moreover shows two types of additional spacers 29, 29' arranged between the line elements (connecting elements) 11, by way of which spacers 29, 29' it is possible to realize—beside the mere spacing-apart of the connecting elements 11—a series of additional functions.

These additional functions comprise in particular a mounting, rotation and positioning aid, a combination of clamp/clip and spacer to form a component (reduction of the individual parts), an additional supporting structure for the battery, fastening possibilities for sensors and cables, means for vibration decoupling, for example through the use of suitable materials or geometries (for example corrugated) or through the use of additional wire pressing rings between spacer 29, 29' and the line elements (connecting elements) 11.

The spacers 29, 29' may be welded or soldered to the connecting elements 11; preferably, however, they are fastened to the connecting elements 11 only by means of form-fitting.

The invention claimed is:

1. A cooling-line system (10) of modular construction, comprising:

at least one tubular connecting element (11) formed of a first metal;

at least two tubular or hose-shaped line elements (15, 16) formed of a second metal, said line elements (15, 16) are connected or are connectable by the connecting element (11), or at least one of said line elements (15, 16) is connectable by the connecting element (11) to a function module to be cooled; and an additional clip element (27) having a U-shaped main body (27*a*) by which the additional clip element is pushable onto the connecting element (11) or onto one of the line elements (15, 16) or the line element (15, 16), the clip element (27) has at least one retaining bracket (27*b*) integrally formed on the main body (27*a*), said retaining bracket (27*b*) is pivotable in relation to the main body (27*a*) behind a respective radial widening (12) on an other of the connecting element (11) and the line element (15) in a pull-out direction to fix the respective line element (15) in a form-fitting manner to the connecting element (11).

2. The cooling-line system (10) as claimed in claim 1, wherein the connecting element (11) has a first connection end (12) and a second connection end (13), said connection ends (12, 13) are configured for connection to in each case one of the line elements (15, 16) or to the line element (15, 16).

3. The cooling-line system (10) as claimed in claim 2, wherein the connecting element (11) has at least one branch (14, 14') between the connection ends (12, 13), and a further line element composed of a metal is connected or is connectable to said at least one branch.

4. The cooling-line system (10) as claimed in claim 3, wherein the branch (14, 14') is formed as a neck or punched-out formation.

5. The cooling-line system (10) as claimed in claim 4, further comprising a connection part (19) for the further line element arranged on the branch (14), and the connection part (19) is of a same type as the first connection end (12) or the second connection end (13).

6. The cooling-line system (10) as claimed in claim 1, wherein the connecting element (11) is widened at least at one of the connection ends (12, 13), and at least one of the line elements (15, 16) or the line element (15, 16) is pushed or pressed into the widened connection end (12, 13).

7. The cooling-line system (10) as claimed in claim 6, wherein the at least one of the line elements (15, 16) or the line element (15, 16) is fixed or is fixable in a materially bonded manner in the widened connection end (12, 13).

8. The cooling-line system (10) as claimed in claim 1, further comprising a sealing element (18) located at least at one of the connection ends (12, 13), that is arranged between the connecting element (11) and at least one of the line elements (15, 16) or the line element (15, 16).

9. The cooling-line system (10) as claimed in claim 1, wherein at least one of the line elements (15, 16) or the line element (15, 16) comprises a corrugated-hose portion (23).

10. The cooling-line system (10) as claimed in claim 9, further comprising a sealing element (18) located at least at one of the connection ends (12, 13), that is arranged between the connecting element (11) and at least one of the line elements (15, 16) or the line element (15, 16), and said sealing element (18) is arranged between two corrugations (16*a*, 16*b*) in the corrugated-hose portion (23).

11. The cooling-line system (10) as claimed in claim 9, wherein, at least at one of the connection ends, the connecting element (11) is slotted over a sub-region of a circumference thereof and has a corresponding slot or cutout (22), and at least one fixing element (17) is pushed into the slot and over a part of the circumference of the line element between two corrugations (16*a*, 16*b*) in the corrugated-hose portion (23) in order to fix the respective line element (16) to the connecting element (11) in a form-fitting manner.

12. The cooling-line system (10) as claimed in claim 11, further comprising an additional clamp element (28) configured to engage over the connecting element (11) and the at least one of the line elements (15, 16) or the line element (15, 16) at the at least one connection end (12, 13) in a region of a sealing element (18), of a corrugation (15*a*) of the line element (15) and of an end widening (12) of the connecting element (11) from the outside in a form-fitting manner.

13. The cooling-line system (10) as claimed in claim 1, wherein the first and the second connection ends (12, 13) have different configurations.

14. The cooling-line system (10) as claimed in claim 1, wherein the connecting element (11) is formed of aluminum and the line element(s) (15, 16) are formed of high-grade steel.

15. The cooling-line system (10) as claimed in claim 3, wherein the at least one branch includes a plurality of branches (14, 14') located at different circumferential positions.

16. The cooling-line system (10) as claimed in claim 1, wherein the connecting element (11) is straight.

17. The cooling-line system (10) as claimed in claim 1, wherein the connecting element (11) is bent.

18. The cooling-line system (10) as claimed in claim 1, wherein the connecting element (11) has a standardized standard connection on one side.

19. The cooling-line system (10) as claimed in claim 1, wherein multiple ones of the connecting elements (11) are arranged adjacently, and in which at least one spacer (29, 29') is arranged between at least two of the connecting elements (11).

* * * * *